United States Patent
Rose et al.

(10) Patent No.: US 12,400,218 B2
(45) Date of Patent: Aug. 26, 2025

(54) NON-FUNGIBLE TOKENIZED CONTRACT EMBEDDED IN A BLOCKCHAIN

(71) Applicant: Credit.com Holdings, LLC, Salt Lake City, UT (US)

(72) Inventors: Taylor Cushman Rose, South Jordan, UT (US); Justin Randall Padawer, Salt Lake City, UT (US)

(73) Assignee: Credit.com Holdings, LLC, New York, NY (US)

( * ) Notice: Subject to any disclaimer, the term of this patent is extended or adjusted under 35 U.S.C. 154(b) by 135 days.

(21) Appl. No.: 17/474,984

(22) Filed: Sep. 14, 2021

(65) Prior Publication Data

US 2023/0080599 A1    Mar. 16, 2023

(51) Int. Cl.
| | |
|---|---|
| G06Q 20/36 | (2012.01) |
| G06Q 20/06 | (2012.01) |
| G06Q 20/40 | (2012.01) |
| H04L 9/08 | (2006.01) |
| H04L 9/32 | (2006.01) |
| H04L 9/00 | (2022.01) |

(52) U.S. Cl.
CPC ......... G06Q 20/363 (2013.01); G06Q 20/065 (2013.01); G06Q 20/401 (2013.01); H04L 9/0825 (2013.01); H04L 9/3213 (2013.01); G06Q 2220/00 (2013.01); H04L 9/50 (2022.05); H04L 2209/56 (2013.01)

(58) Field of Classification Search
None
See application file for complete search history.

(56) References Cited

U.S. PATENT DOCUMENTS

| | | | |
|---|---|---|---|
| 8,380,591 B1 * | 2/2013 | Kazenas | G06Q 20/102 705/40 |
| 10,946,283 B1 * | 3/2021 | Meilich | G06Q 20/3674 |
| 11,367,060 B1 * | 6/2022 | Barbashin | G06Q 30/0201 |
| 2004/0044607 A1 * | 3/2004 | Hedrick, Jr. | G06Q 40/00 705/35 |
| 2015/0081518 A1 * | 3/2015 | Collins | G06Q 40/03 705/38 |
| 2019/0114640 A1 * | 4/2019 | Rubin | G06F 18/23213 |

(Continued)

FOREIGN PATENT DOCUMENTS

AU         2021221594 A1 *  5/2022

*Primary Examiner* — Neha Patel
*Assistant Examiner* — Jahed Ali
(74) *Attorney, Agent, or Firm* — Workman Nydegger

(57) ABSTRACT

Techniques for implementing a tokenized contract on a blockchain are disclosed. A contract is obtained, where that contract specifies certain contract conditions. The contract is minted as a non-fungible token (NFT) to generate a tokenized contract. The tokenized contract includes logic that tracks operations to determine whether the contract conditions have been satisfied. The tokenized contract is digitally signed and linked with a crypto wallet that is embedded in a blockchain. A digital payment is received, where this payment is directed towards the tokenized contract. The logic of the tokenized contract tracks receipt of the digital payment. The tokenized contract informs the crypto wallet of the received digital payment. As a result of informing the crypto wallet of the received digital payment, the received digital payment is recorded in a distributed ledger managed by the blockchain.

20 Claims, 11 Drawing Sheets

(56) References Cited

U.S. PATENT DOCUMENTS

| | | | |
|---|---|---|---|
| 2019/0188719 A1* | 6/2019 | Das | G06Q 30/06 |
| 2019/0299105 A1* | 10/2019 | Knight | H04L 9/3247 |
| 2020/0184553 A1* | 6/2020 | Serrano | G06Q 20/405 |
| 2020/0327609 A1* | 10/2020 | Dubrofsky | G06Q 40/06 |
| 2021/0082044 A1* | 3/2021 | Sliwka | H04L 9/3255 |
| 2021/0133875 A1* | 5/2021 | Foote | G06Q 20/0658 |
| 2021/0248594 A1* | 8/2021 | Yantis | G06F 21/602 |
| 2021/0281410 A1* | 9/2021 | Hain | G06Q 20/065 |
| 2022/0021538 A1* | 1/2022 | Madisetti | H04L 63/105 |
| 2022/0058614 A1* | 2/2022 | Savanah | G06Q 20/29 |
| 2022/0210061 A1* | 6/2022 | Simu | G06Q 20/3829 |
| 2022/0230175 A1* | 7/2022 | Haruna | G06Q 20/065 |
| 2022/0271915 A1* | 8/2022 | Turner | H04L 9/0643 |
| 2022/0383303 A1* | 12/2022 | Mullen | G06Q 20/389 |
| 2022/0405409 A1* | 12/2022 | Cheng-Shorland | G06F 21/64 |
| 2022/0406419 A1* | 12/2022 | Kruger | G06Q 20/3674 |
| 2023/0034169 A1* | 2/2023 | Ferenczi | H04L 9/3271 |
| 2023/0045056 A1* | 2/2023 | Padmanabhan | H04L 9/50 |
| 2023/0062776 A1* | 3/2023 | Vosseller | G06Q 30/018 |

\* cited by examiner

NON-FUNGIBLE TOKENIZED CONTRACT EMBEDDED IN A BLOCKCHAIN

BACKGROUND

A non-fungible token (NFT) is a one-of-a-kind digital token that cannot be replaced. The term "fungible" means that a first item can be replaced with a second item, and those two items are of the same type. A bitcoin, for example, is considered to be fungible because one bitcoin can be replaced with another bitcoin. A one-of-a-kind trading card, on the other hand, is non-fungible. If that trading card truly is unique, then no other trading card can operate as a replacement for it. NFTs are non-fungible units of data implemented in the digital space.

At this time, most, though not all, NFTs live in the Ethereum blockchain. Ethereum is a type of blockchain that is configured to support NFTs. An NFT is unique from traditional cryptocurrency in that NFTs are configured to store enhanced or additional information that enables an NFT to be completely unique from other digital items.

An NFT is stored on a digital ledger (i.e. the blockchain) and is a unit of data that can be certified as a digital asset that is non-interchangeable. Various types of digital content can be represented as NFTs, including photos, videos, audio, and so on. The blockchain is used to track NFTs in order to provide the owner of the NFT with a proof of ownership. With the emergence of NFTs, there are now many applications in which NFTs can be used.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for implementing a tokenized contract on a blockchain. A tokenized contract can also be referred to as a "dynamic NFT."

Some embodiments obtain a contract that specifies contract conditions. The embodiments also mint the contract as a non-fungible token (NFT) to generate a tokenized contract. The tokenized contract includes logic that tracks operations to determine whether the contract conditions have been satisfied. The tokenized contract is then digitally signed. Furthermore, the embodiments link the tokenized contract with a crypto wallet that is embedded in a blockchain. A digital payment is received, where this payment is directed towards the tokenized contract. The logic of the tokenized contract tracks receipt of the digital payment. The embodiments cause the tokenized contract to inform the crypto wallet of the received digital payment. As a result of informing the crypto wallet of the received digital payment, the received digital payment is recorded in a distributed ledger managed by the blockchain.

Optionally, some embodiments also identify a transfer of ownership of the tokenized contract from the crypto wallet to a second crypto wallet. As another option, the contract can include a credit score of a user associated with the contract.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein relate to systems, devices, and methods for implementing a tokenized contract on a blockchain. A tokenized contract can also be referred to as a "dynamic NFT."

Some embodiments obtain a contract and then mint the contract as an NFT to thereby generate a tokenized contract. The tokenized contract includes logic that tracks certain operations or conditions. The tokenized contract is digitally signed. The tokenized contract is linked with a crypto wallet. A digital payment is received at the tokenized contract. The logic tracks receipt of the digital payment. The embodiments cause the tokenized contract to inform the crypto wallet of the received digital payment. As a result of informing the crypto wallet of the received digital payment, the received digital payment is recorded in a distributed ledger managed by the blockchain.

Optionally, some embodiments also identify a transfer of ownership of the tokenized contract from the crypto wallet to a second crypto wallet. As another option, the contract can include a credit score of a user associated with the contract.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

Embodiments disclosed herein significantly improve the technical field. In particular, the embodiments are able to utilize a smart contract in a new and improved manner. Specifically, the disclosed embodiments are able to mint a smart contract as a non-fungible token (NFT) and then store that NFT in a blockchain. In doing so, the embodiments significantly increase the level of security that is now available for contracts, such as by preventing tampering with contract terms and conditions. By following the disclosed principles, users can be assured that the smart contract is accurate and has not been misused.

The embodiments also use NFTs in a new and unique manner. Specifically, smart contracts can now be minted as NFTs. An NFT is a unit of data that is entirely unique and that cannot be replaced with another item. By minting a smart contract as an NFT, the embodiments provide assurances and guarantees as to the trustworthiness and security of the smart contract. Accordingly, user involvement with smart contracts and NFTs is significantly improved. These and many other benefits will now be discussed in more detail throughout the remaining portions of this disclosure.

Non-Fungible Tokens, Blockchains, And Smart Contracts

Figure 1:
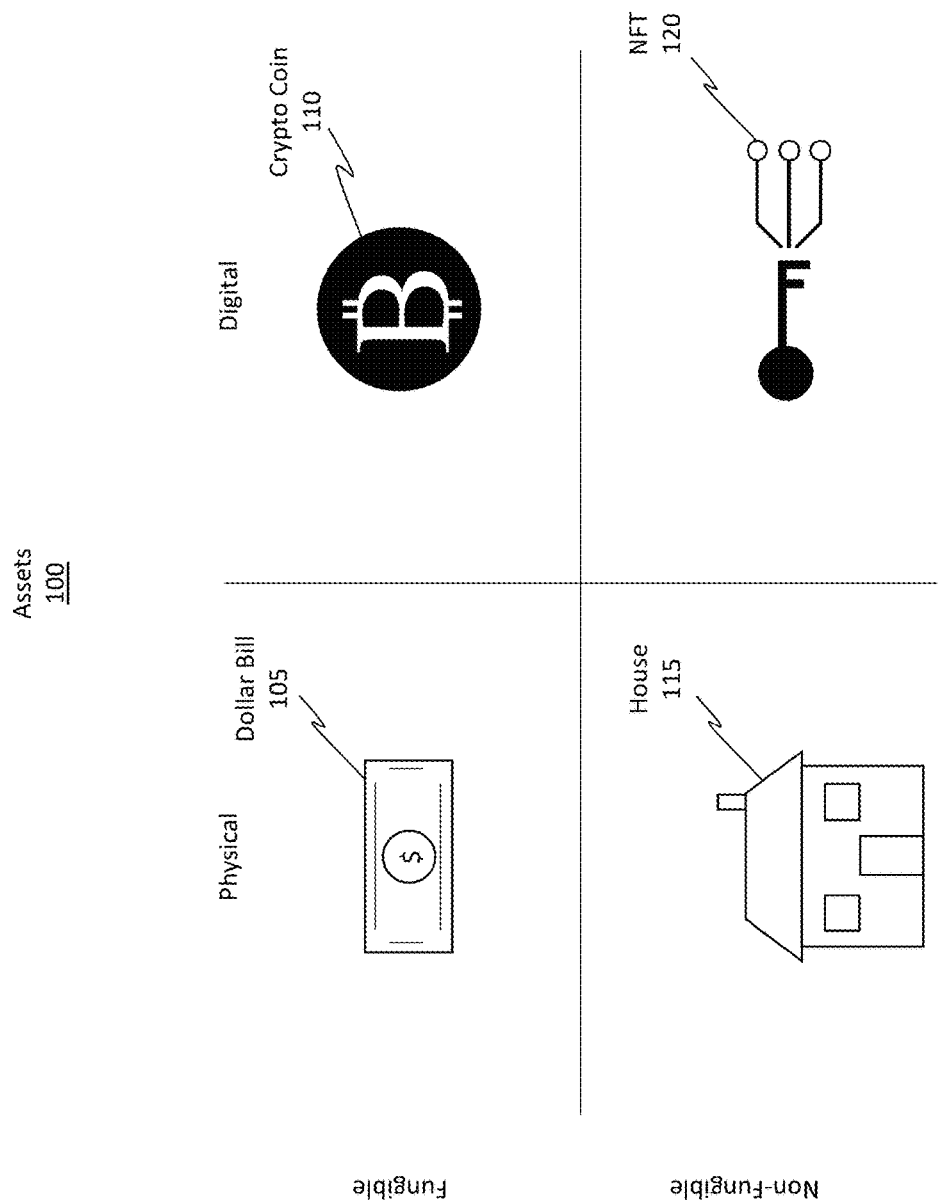
FIG. 1 illustrates different types of assets, including fungible physical assets, fungible digital assets, non-fungible physical assets, and non-fungible digital assets.

Attention will now be directed to FIG. 1, which illustrates various different types of assets 100. These assets 100 include fungible physical assets, such as a dollar bill 105 and fungible digital assets, such as a crypto coin 110. The assets 100 also include non-fungible physical assets, such as a house 115, and non-fungible digital assets, such as a non-fungible token NFT 120. As discussed previously, an NFT is a one-of-a-kind digital item or token that cannot be replaced or interchanged with another item. The NFT 120 is stored on a blockchain's digital ledger, as shown by FIG. 2.

Figure 2:
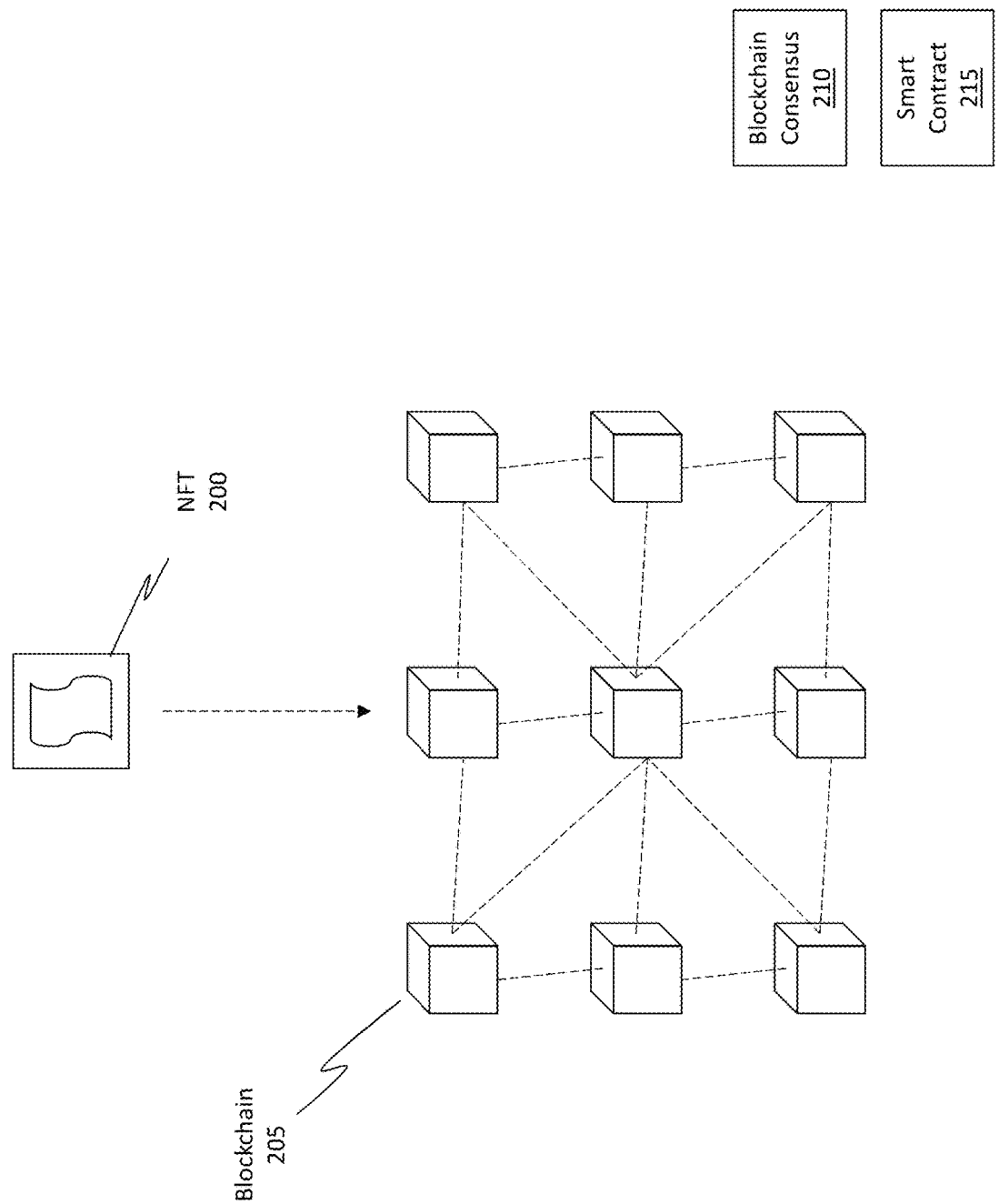
FIG. 2 illustrates how a non-fungible token (NFT) can reside in a blockchain.

Specifically, FIG. 2 shows an NFT 200, which is representative of the NFT 120 from FIG. 1. The NFT 200 lives or is stored in the blockchain 205. The blockchain 205 can be any type of blockchain, without limit (e.g., Bitcoin blockchain, Ethereum blockchain, and so on). A blockchain (e.g., blockchain 205) is a specific type of database. This database differs from traditional databases in that a blockchain stores data in blocks that are dispersed and chained together. When new data is entered into the blockchain, a new block is generated to house the data and that new block is linked or chained with the existing blocks in the blockchain. The blocks are also distributed and repeated across different nodes in the blockchain in a decentralized manner. Transactions that are recorded using the blockchain are immutable, meaning that once the data is entered, that data is permanent and is viewable by all the nodes in the blockchain.

Stated differently, a blockchain is a type of distributed ledger that is viewable by any node in the blockchain. Once information has been entered into the blockchain, it is almost impossible to change that data. Each block in the blockchain includes various pieces of information, including specific data, a hash for that block, and a hash of the previous block occurring previous in time to the current block (based on a chronological order). The type of the blockchain determines what type of data can be included in a block.

Hashes provide a strong framework to prevent against tampering. That being said, the use of hashes alone is not sufficient to prevent tampering. As such, most blockchains incorporate a principle referred to as "proof of work." Proof of work operates to slow down or delay how quickly new blocks can be added to the blockchain. Because computers can generate hundreds of thousands of hashes each second, there is a chance (though small) that a fraudulent user could tamper with one block and then revalidate all subsequent blocks to ensure the hashes align with one another. By incorporating the proof of work principle, however, new blocks cannot be readily added or modified to the blockchain. In fact, some proof of work principles cause a 10 minute delay to occur before a new block can be added or modified to the blockchain. So, if one block were to be tampered with, that tampering would become readily apparent during the delay time period imposed by the proof of work principle. Accordingly, through the use of hashes and the proof of work principle, it is extremely difficult to tamper with the blockchain.

Blockchains provide yet another safeguard against tampering, where that safeguard occurs as a result of the blockchain being distributed amongst numerous different nodes. That is, blockchains rely on a peer to peer network of nodes as opposed to being managed by a centralized entity. When a new block is added to the blockchain, that new block is sent to every node that exists or that handles the blockchain. Then, each individual node verifies the authenticity of that new block, such as by comparing and analyzing the hash information. If the analysis indicates that the new block is authentic, then the new block is chained to the existing blocks and added to the blockchain. In this sense, all of the nodes in the blockchain create consensus regarding the authenticity of the blockchain, as shown by blockchain consensus 210 (i.e. all of the nodes in the peer to peer network verify the authenticity of blocks in the blockchain, thereby agreeing as to which blocks are valid and which blocks are not valid).

Blockchains are constantly evolving, and new information is being added to blockchains. For instance, in accordance with the disclosed principles, a so-called "smart contract" 215 can be introduced to the blockchain. A smart contract is a type of application or computer program that can be saved in the blockchain. A smart contract is designed to automatically transfer or exchange digital currency, such as digital coins, based on terms and conditions outlined in the smart contract.

Notably, because the smart contract lives or exists in the blockchain, no single individual or entity is in control of the digital funds; rather, the control is distributed and viewable for all to see. As such, a smart contract inherits properties associated with items being stored on the blockchain; that is, a smart contract residing on the blockchain is both distributed (i.e. every node validates the authenticity of the smart contract) and immutable (i.e. it can never be changed and thus cannot be tampered with). In this sense, the output of the smart contract is required to be validated by all nodes in the blockchain prior to any funds collected by the smart contract being distributed to a payee.

Credit Reports And Scores

Figure 3:
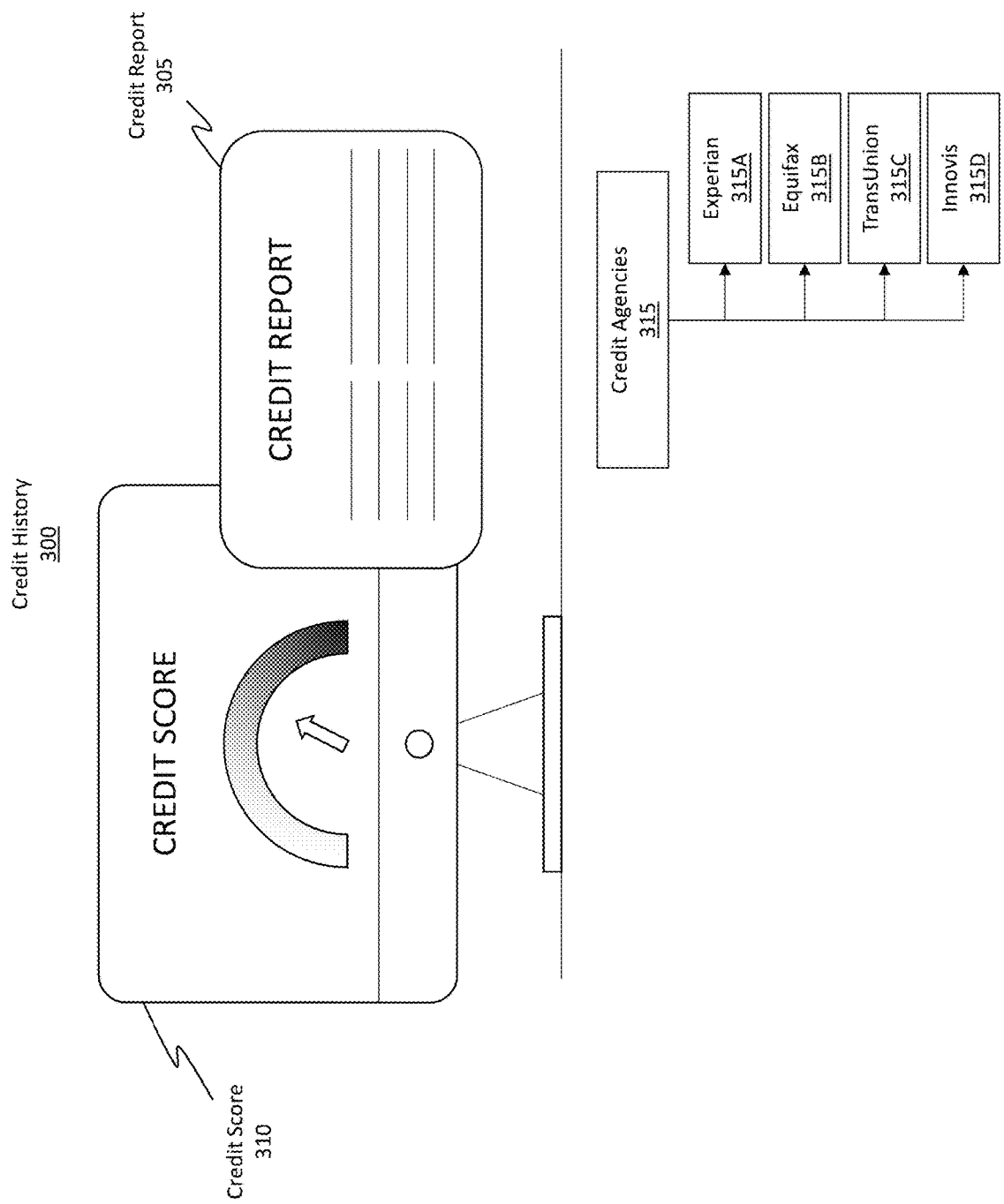
FIG. 3 illustrates a user's credit report and credit score.

Attention will now be directed to FIG. 3, which provides details regarding a user's credit history 300. Generally, a credit history 300 refers to a historical record detailing a user's ability to pay or repay debts incurred by the user over time. In this regard, the credit history 300 generally demonstrates the user's efforts, responsibility, behaviors, and patterns in paying his/her debts.

A credit report 305 is a report that provides details regarding the user's credit history 300. A credit report 305 includes any number of tradelines, which is a line item in the credit report 305 and which details credit accounts opened by the user. Tradelines can include numerous different types of information. Examples of tradelines include, but are not limited to, lines of credit, loans, payment history, and collections accounts. These different tradelines may all be included in a user's credit report, which details the user's credit history.

The credit report 305 often includes a plethora of information. In an effort to provide a quick measurement or gauge regarding a user's credit history, a credit score 310 is often computed for the user. The credit score 310 is a three digit number, typically ranging anywhere between 300 and 900, that outlines and that summarizes a user's creditworthiness. Higher credit scores indicate higher creditworthiness while lower credit scores indicate lower creditworthiness.

Generally, credit scores are broken up into various categories. Scores ranging between 300-559 are generally considered to be "Poor." Scores ranging between 560-659 are generally considered to be "Fair." Scores ranging between 660-724 are considered to be "Good Credit." Scores ranging between 725-759 are considered to be "Very Good Credit." Scores ranging between 760-900 are considered to be "Excellent Credit." A person's credit score is a calculus based on the tradelines included in his/her credit report, or rather, in the credit history.

There are multiple entities, or credit agencies 315, that monitor and record user's credit histories. Examples of these credit agencies 315 include Experian 315A, Equifax 315B, TransUnion 315C, and Innovis 315D. These credit agencies 315 collect and research the credit information for users and are able to provide that information to interested lenders.

Figure 4:
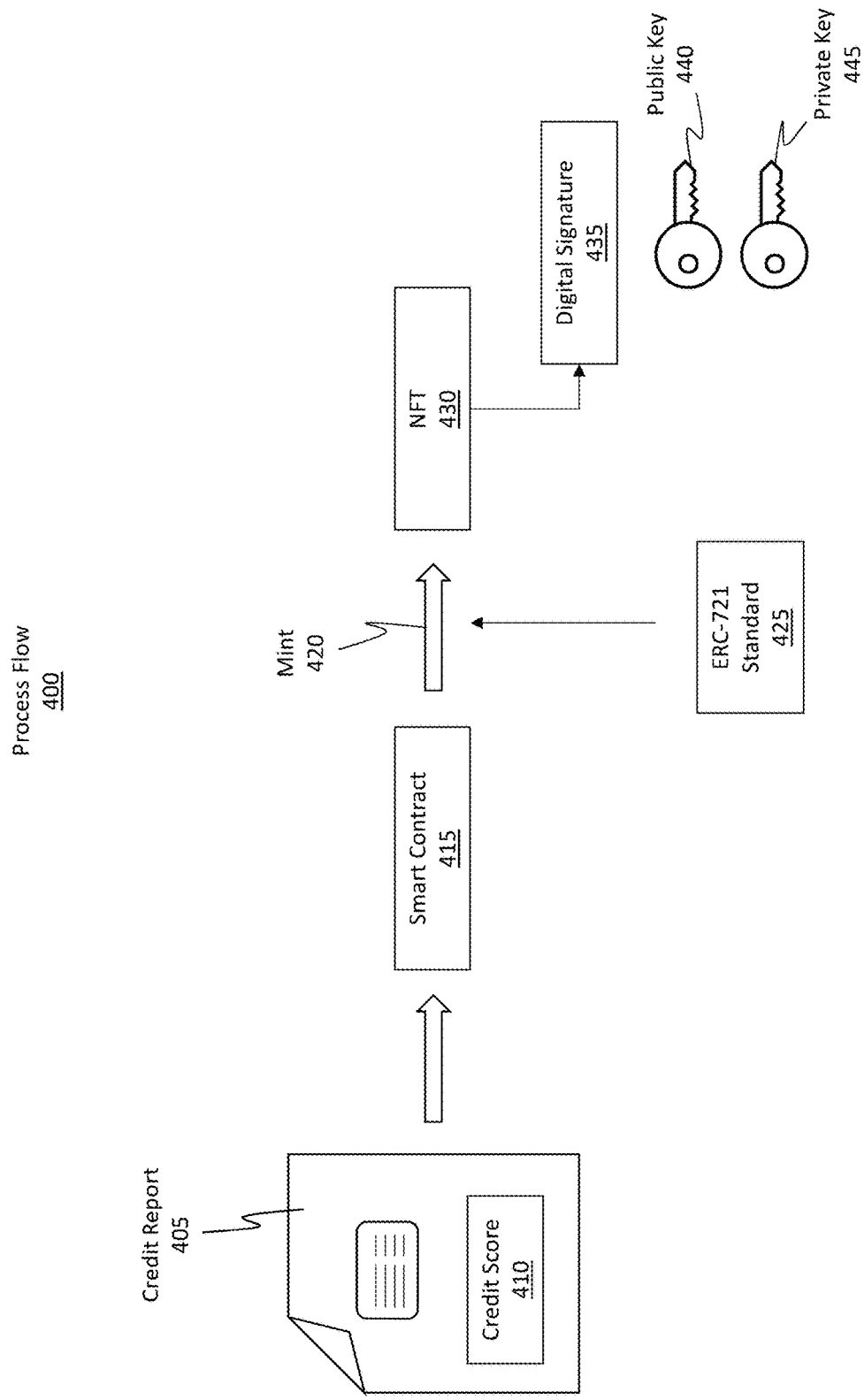
FIG. 4 illustrates how the user's credit report, or at least the credit score, can be minted as an NFT and digitally signed.

Implementing Credit Scores into Smart Contracts and Minting the Smart Contracts as NFTs According to the disclosed principles, a user's credit report and/or credit score can be included in a smart contract, and then that smart contract can be minted as an NFT and placed in the blockchain. FIG. 4 illustrates an example process flow 400 for performing those operations.

Initially, a credit report 405 is obtained, where that credit report 405 can include a user's credit score 410. The credit report 405 and the credit score 410 are obtained from one or more different credit bureaus. The credit report 405 and/or the credit score 410 are included in a smart contract 415, which is representative of the smart contract 215 mentioned in FIG. 2.

In addition to the credit report 405 and/or the credit score 410, the smart contract 415 can include any number of terms or conditions that determine whether the smart contract 415 is satisfied or not. The smart contract 415 is then minted, as shown by mint 420. In some cases, the minting process is performed using the Ethereum blockchain, such as by using the ERC-271 standard 425. Of course, this minting process is just one example only, and other minting techniques and blockchain standards can be used. Accordingly, in some embodiments, though not necessarily all, the tokenized contract is minted using an ERC-721 standard.

As a result of performing the minting process, the embodiments generate an NFT 430. Stated differently, the smart contract 415 is minted into a tokenized contract (aka a "dynamic NFT") having the form of an NFT 430. Optionally, a user can digitally sign the tokenized contract, as shown by digital signature 435, in order to reduce or prevent fraudulent use of the tokenized contract. The digital signature 435 can be performed using a public key 440 or a private key 445.

Figure 5:
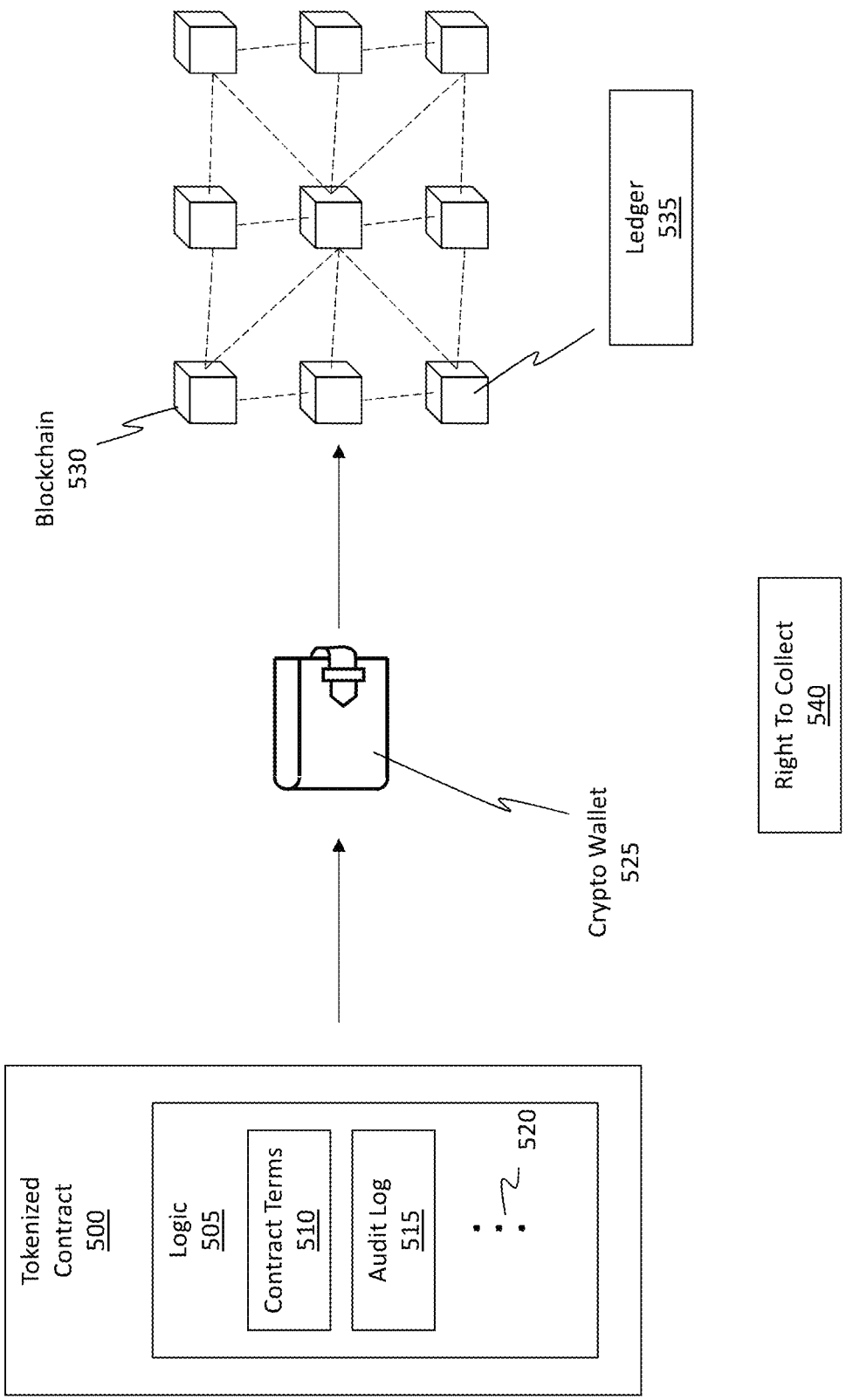
FIG. 5 illustrates how a tokenized contract (aka a "dynamic NFT"), which can exist as an NFT and which can include the user's credit score, can be implemented in a crypto wallet embedded in the blockchain.

FIG. 5 provides additional details regarding how to implement a tokenized contract (e.g., a smart contract that has been minted as an NFT in the blockchain) in a blockchain peer to peer network. In particular, FIG. 5 shows a tokenized contract 500, which is representative of the NFT 430 shown in FIG. 4 in that the smart contract 415 was minted as the NFT 430 and digitally signed. Notice, the tokenized contract 500 includes logic 505, such as perhaps contract terms 510 and logic to determine whether those terms have been satisfied, and an audit log 515.

The contract terms 510 can include any type of term or condition. For example, the terms can include a required time or time period in which a payment is to be received. The terms can also indicate a specific IP address or user account that is supposed to submit the payment. The terms can indicate how much the payment is to be. The terms can also indicate a type of payment method that is required, such as payment via a specific type of digital currency (e.g., bitcoin or some other digital currency).

The audit log 515 can record information regarding transactions that have occurred and/or even record information regarding transference of the tokenized contract 500. In some cases, the audit log 515 can include information about a user's computer, such as an IP address as to which computer has engaged in a transaction or transfer. The audit log 515 can also include timestamp information indicating a time when a transaction or transference occurred.

The ellipsis 520 indicates that additional information and logic can be included in the tokenized contract 500. For instance, the user's credit report and credit score can be included in the tokenized contract 500.

The tokenized contract 500 is initially linked or associated with a crypto wallet 525. Generally, the crypto wallet 525 is designed to store and manage a user's public and private keys, which are used to provide digital signatures to authenticate or authorize a transaction. The crypto wallet 525 operates in the blockchain 530 as a part of a digital ledger 535 for tracking and monitoring a user's transactions.

Possession of the tokenized contract 500 indicates a right to collect 540 on the terms and conditions outlined in the tokenized contract 500. For instance, if the tokenized contract 500 indicates that one user owes another user $500, then possession of the tokenized contract 500 indicates that the possessor has the right to collect the $500.

Payments, Transfers, And Alerts

Figure 6:
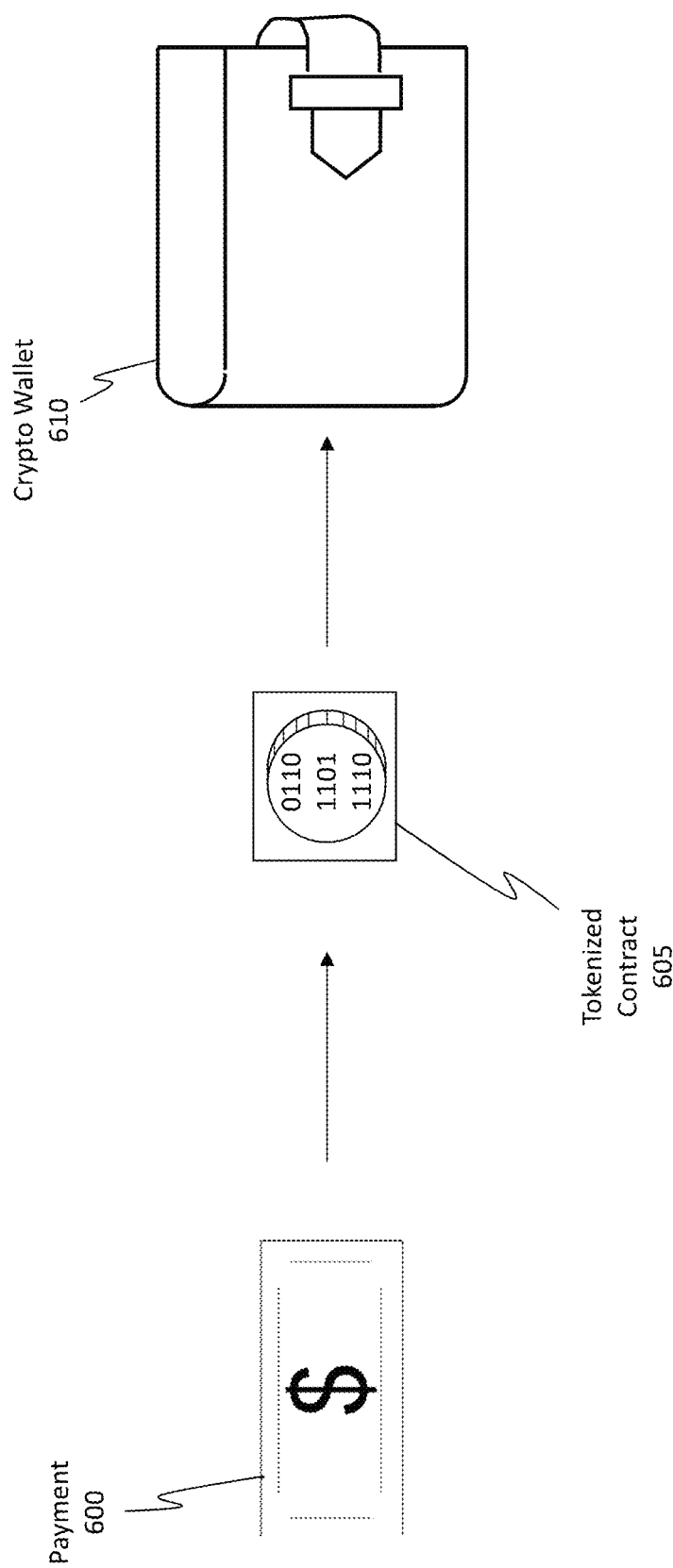
FIG. 6 illustrates how payments can be directed to the tokenized contract.

FIG. 6 shows how payments can be made directly to a tokenized contract. For instance, a payment 600 is submitted to a tokenized contract 605, which is currently owned by a particular crypto wallet 610. The payment 600 can be any type of digital payment or currency. The tokenized contract 605 includes the logic for tracking and monitoring payments that are made. Those payments can also be recorded by the crypto wallet 610 and stored in the distributed ledger provided by the blockchain.

Figure 7:
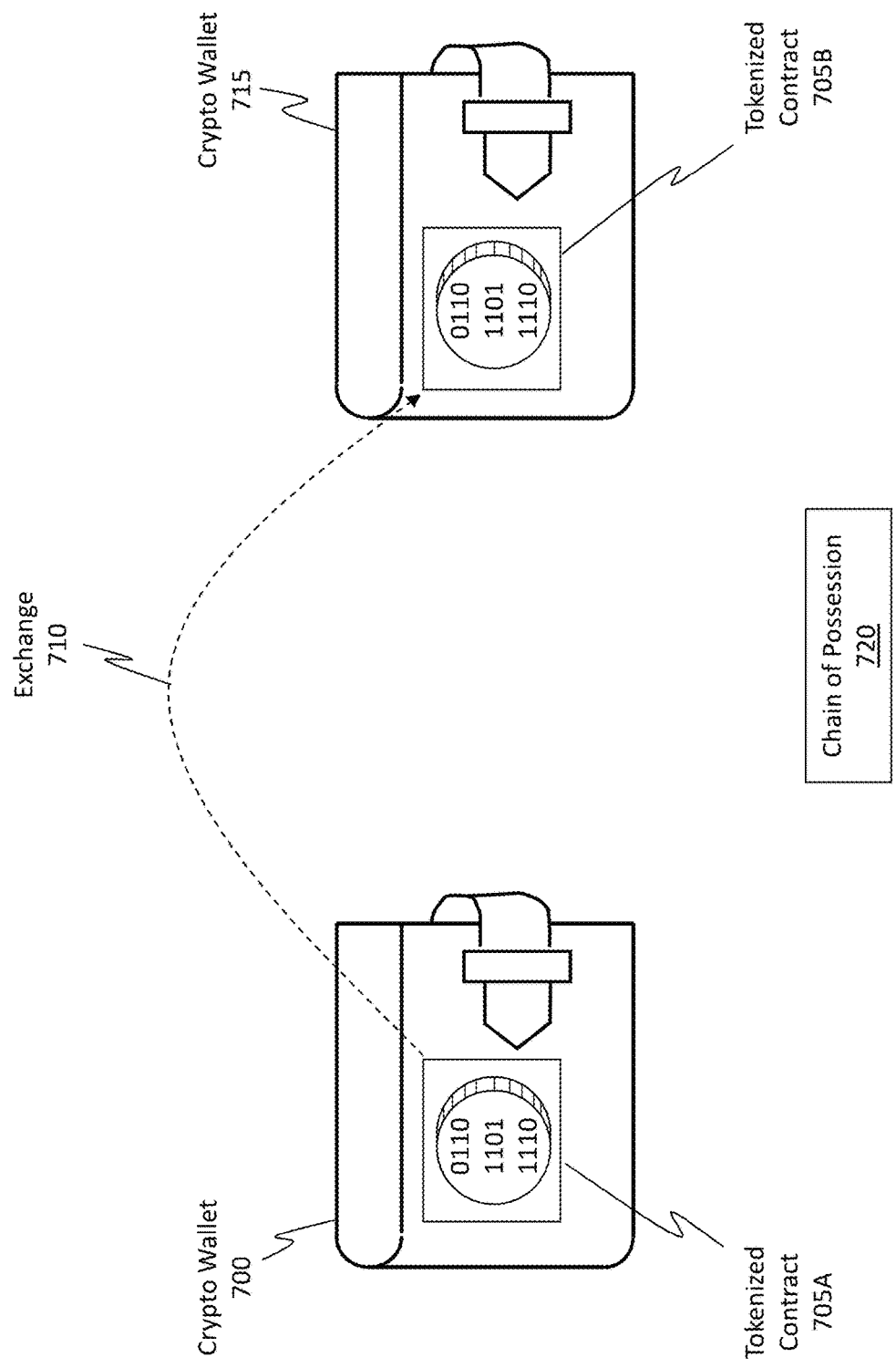
FIG. 7 illustrates how the tokenized contract can be transferred from one crypto wallet to another crypto wallet.

FIG. 7 shows how a tokenized contract can be transferred between different crypto wallets. Specifically, FIG. 7 shows a first crypto wallet 700 that manages or includes a tokenized contract 705A. Initially, the owner of the crypto wallet 700 has the right to collect based on the terms outlined in the tokenized contract 705A. The tokenized contract 705A is then exchanged (e.g., as shown by exchange 710) or otherwise transferred to a second crypto wallet 715, as shown by the tokenized contract 705B now residing in the crypto wallet 715. That is, the tokenized contract 705B is representative of the tokenized contract 705A.

The distributed ledger in the blockchain is able to manage and monitor the chain of possession 720 of the tokenized contract 705A to ensure that the tokenized contract 705A is not mishandled or tampered. The chain of possession 720 refers to a listing of entities or wallets that have possessed the tokenized contract. The chain of possession 720 can optionally be included in the audit log mentioned earlier. The chain of possession 720 can include information reflecting user account information, IP address information, device information, and so on.

Figure 8:
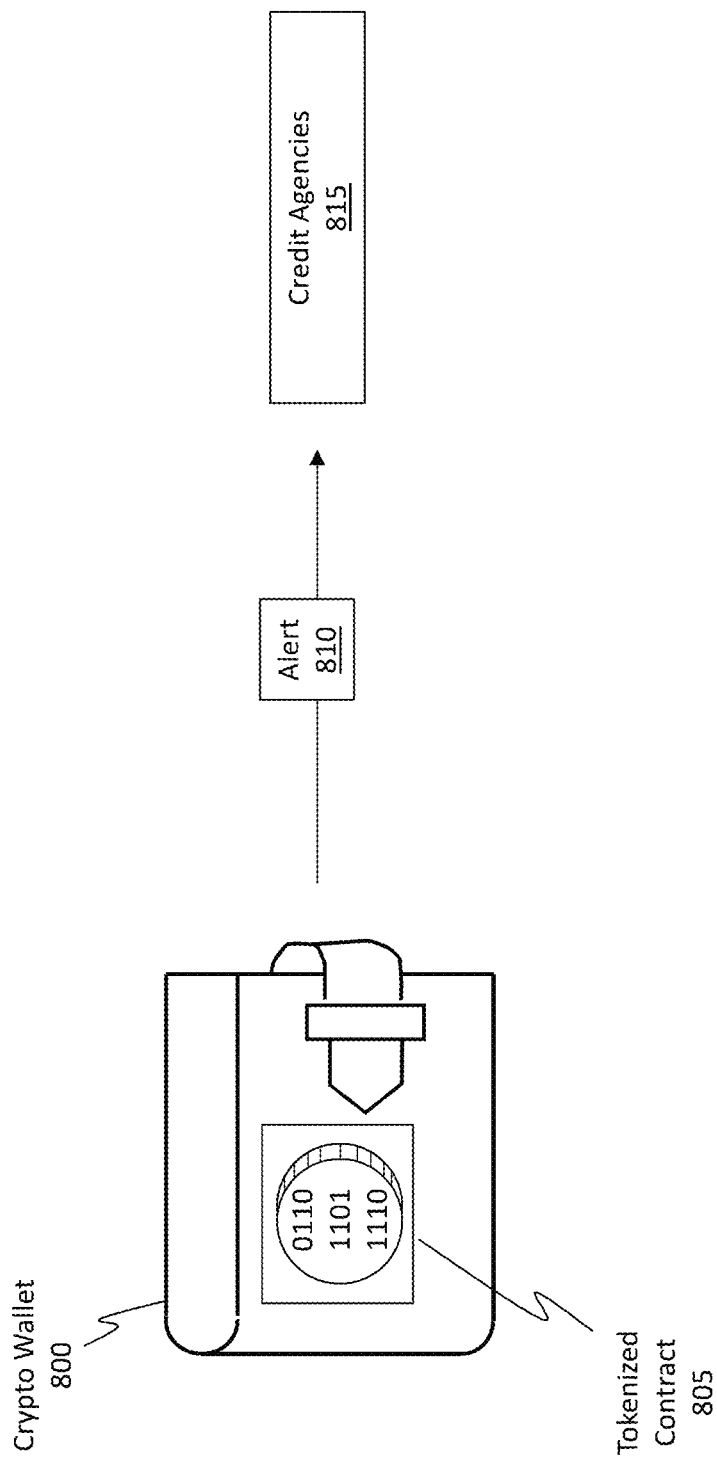
FIG. 8 illustrates how the tokenized contract can issue alerts to any number of credit agencies or bureaus.

The disclosed embodiments are also able to alert various credit agencies or bureaus regarding conditions that occur. For instance, FIG. 8 shows a crypto wallet 800 that includes a tokenized contract 805. The tokenized contract 805 outlines or dictates terms and conditions that are required as a part of the smart contract. As an example, suppose a payment is supposed to be received by the 5$^{th}$ of each month for the smart contract. If a payment is received or, alternatively, if a payment is not received (or is received late), the logic in the tokenized contract 805 is able to monitor those payments or lack of payments.

The logic is further able to trigger and send an alert 810 to any number of credit agencies 815 to inform those agencies regarding the payment status of the smart contract. The alert 810 can detail a payment that was made, a payment that was deferred, a late payment, or a payment that was not made and thus is delinquent. The alert 810 can include other information as well, such as which specific party is responsible for the payment and is responsible for receiving the payment. The alert 810 can also outline the terms and conditions that were either satisfied, partially satisfied, or not satisfied.

Although the above example focused on a scenario where the alert 810 was sent to credit agencies 815, one will appreciate how the alert 810 can be sent to other agencies as well. For instance, the alert 810 can be sent to any type of financial institution (e.g., banks, lenders, credit unions, etc.). Additionally, the alert 810 can be sent to other interested parties, such as perhaps a co-signer to a loan that is included in the tokenized contract 805.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
FIG. 9 illustrates a flowchart of an example method for implementing a tokenized contract in a blockchain.

FIG. 9 shows a flowchart of an example method 900 for implementing a tokenized contract (aka a "dynamic NFT") within the blockchain. The method 900 can be performed using the tokenized contract 500, the crypto wallet 525, and the blockchain 530 of FIG. 5.

Initially, method 900 includes an act (act 905) of obtaining a contract that specifies contract conditions. Optionally, the contract can include a credit report and/or a credit score of a user associated with the contract. The contract is a smart contract, such as the one discussed in connection with FIG. 4 (e.g., smart contract 415), and the smart contract can include logic for determining whether various terms and conditions are satisfied.

Act 910 involves minting the contract as a non-fungible token (NFT) to generate a tokenized contract. The tokenized contract includes logic that tracks operations to determine whether the contract conditions have been satisfied. Any type of blockchain can be used to mint the NFT. Examples of such blockchains include, but are not limited to, the Ethereum blockchain, the Binance Smart Chain, the Flow chain, Tron, Texos, Cosmos, EOS, WAX, and even Polkadot.

In some embodiments, the logic of the tokenized contract includes logic to determine whether a payment is missed or is paid or is late. In some cases, the logic of the tokenized contract includes logic for transmitting an alert when a payment for the tokenized contract is missed. Optionally, the alert can be transmitted to one or more credit agencies. The logic can also include an audit log that tracks a history associated with the tokenized contract, such as perhaps which crypto wallets have previously or are currently possessing the tokenized contract. The logic can include a chain of possession of the tokenized contract, and the logic can also record a transfer of ownership of the tokenized contract.

The minting process involves the use of a crypto wallet that supports NFTs. The wallet in the respective blockchain can be configured to upload an item, which will be transformed or minted into an NFT. Various platforms are available to perform the actual minting process, such as the opensea.io platform. This platform is designed to facilitate NFT minting and creation.

In an effort to prevent fraud and misuse, method 900 includes an act (act 915) where a user digitally signs the tokenized contract. This digital signature can occur using the user's public and/or private keys. Stated differently, digitally signing the tokenized contract can include signing the tokenized contract with one of a private key or a public key. Digitally signing the tokenized contract operates to prevent unauthorized users from using the tokenized contract.

Act 920 involves linking the tokenized contract with a crypto wallet that is embedded in a blockchain. Possession of the tokenized contract in a crypto wallet indicates a right to collect on the contract.

Act 925 includes receiving a digital payment that is directed towards the tokenized contract. Act 930 involves causing the tokenized contract to inform the crypto wallet of the received digital payment. Notably, as a result of informing the crypto wallet of the received digital payment, the received digital payment is recorded in a distributed ledger managed by the blockchain. As an optional act (as indicated by the dashed border in act 935), there is an act (act 935) of identifying a transfer of ownership of the tokenized contract from the crypto wallet to a second crypto wallet.

Figure 10:
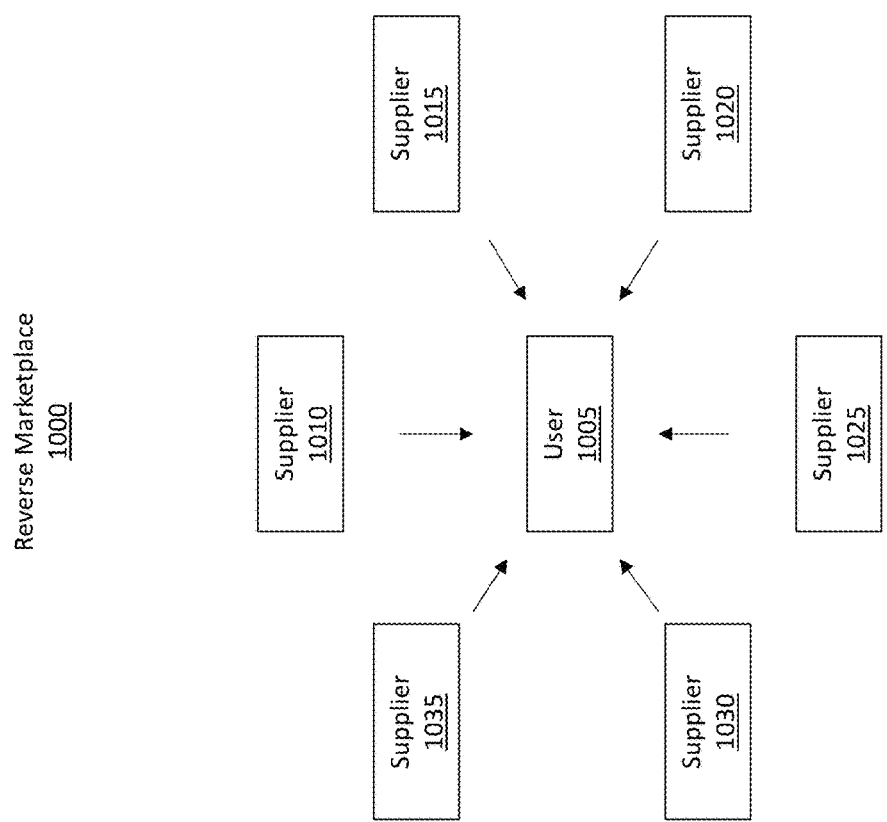
FIG. 10 illustrates an example of a reverse marketplace.

By tokenizing credit reports and scores into NFTs, the disclosed embodiments can also facilitate a reverse marketplace, as shown by the reverse marketplace 1000 of FIG. 10. With a reverse marketplace 1000, a user 1005 can submit his/her tokenized credit information (e.g., credit information that has been minted into an NFT), and multiple suppliers (e.g., suppliers 1010, 1015, 1020, 1025, 1030, and 1035) can attempt to underbid one another to perform services for the user 1005. To clarify, in this scenario, instead of price bids increasing, those price bids decrease until a lowest price is achieved. The user 1005 can then optionally select whichever supplier is willing to perform the requested service at the lowest price. A smart contract can be generated and operated on in the manner described herein. Accordingly, the embodiments can facilitate a reverse marketplace 1000.

In this manner, the disclosed embodiments beneficially are able to mint a smart contract as an NFT. By generating the so-called tokenized contract or dynamic NFT, the embodiments provide an enhanced level of protection and assurance with regard to the underlying smart contract. Because the tokenized contract lives in the blockchain, the protections provided by the blockchain are also provided to the smart contract. Accordingly, the disclosed embodiments are able to beneficially implement a tokenized contract on the blockchain.

Example Computer/Computer Systems

Figure 11:
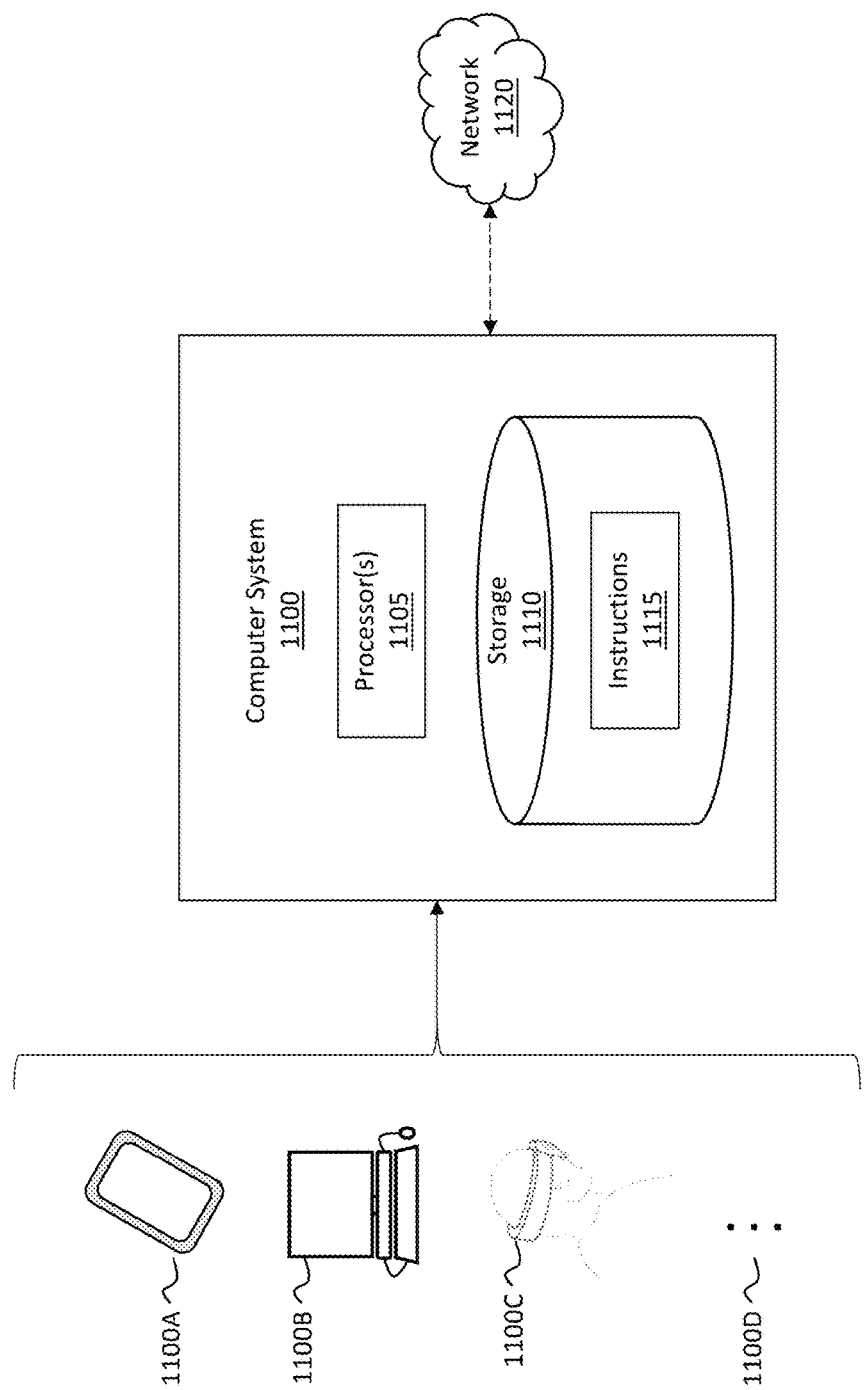
FIG. 11 illustrates an example computer system that can be configured to perform any of the disclosed operations.

Attention will now be directed to FIG. 11 which illustrates an example computer system 1100 that may include and/or be used to perform any of the operations described herein. Computer system 1100 may take various different forms. For example, computer system 1100 may be embodied as a tablet 1100A, a desktop or a laptop 1100B, a wearable device 1100C, a mobile device, or a standalone device. The ellipsis 1100D indicates that other form factors are available as well. Computer system 1100 may also be a distributed system that includes one or more connected computing components/devices that are in communication with computer system 1100.

In its most basic configuration, computer system 1100 includes various different components. FIG. 11 shows that computer system 1100 includes one or more processor(s) 1105 (aka a "hardware processing unit") and storage 1110.

Regarding the processor(s) 1105, it will be appreciated that the functionality described herein can be performed, at least in part, by one or more hardware logic components (e.g., the processor(s) 1105). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1100. The different components, modules, engines, and services described herein may be implemented as objects or processors that execute on computer system 1100 (e.g. as separate threads).

Storage 1110 may be physical system memory, which may be volatile, non-volatile, or some combination of the two. The term "memory" may also be used herein to refer to non-volatile mass storage such as physical storage media. If computer system 1100 is distributed, the processing, memory, and/or storage capability may be distributed as well.

Storage 1110 is shown as including executable instructions 1115. The executable instructions 1115 represent instructions that are executable by the processor(s) 1105 of computer system 1100 to perform the disclosed operations, such as those described in the various methods.

The disclosed embodiments may comprise or utilize a special-purpose or general-purpose computer including computer hardware, such as, for example, one or more processors (such as processor(s) 1105) and system memory (such as storage 1110), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1100 may also be connected (via a wired or wireless connection) to external sensors (e.g., one or more remote cameras) or devices via a network 1120. For example, computer system 1100 can communicate with any number devices or cloud services to obtain or process data. In some cases, network 1120 may itself be a cloud network. Furthermore, computer system 1100 may also be connected through one or more wired or wireless networks 1120 to remote/separate computer systems(s) that are configured to perform any of the processing described with regard to computer system 1100.

A "network," like network 1120, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1100 will include one or more communication channels that are used to communicate with the network 1120. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for increasing security of a smart contract by implementing a tokenized smart contract on a blockchain, said method being implemented within a computing system, which is implemented as a blockchain node in the blockchain, comprising a decentralized, distributed database in a form of a blockchain and a non-fungible token (NFT) minting platform, said method comprising:

accessing, by the blockchain node, a smart contract that specifies smart contract conditions, wherein the smart contract conditions include an indication of a specific type of digital currency that is to be used when one or more digital payments are directed to the smart contract, wherein the smart contract is structured for execution on the blockchain, said execution including an automatic exchange of the specific type of digital currency based on the smart contract conditions;

minting, by the blockchain node, the smart contract as an NFT to generate a tokenized smart contract that resides within a first crypto wallet associated with the blockchain, wherein the tokenized smart contract includes logic that tracks operations to determine whether the smart contract conditions have been satisfied, wherein said tracking of the operations is performed while the tokenized smart contract resides in the blockchain, wherein the tokenized smart contract is further structured to include an audit log, wherein the logic is further structured to cause the audit log to record (i) information regarding transactions for the tokenized smart contract and (ii) information regarding a transfer of the tokenized smart contract, such that the logic enables the audit log to maintain information regarding a chain of possession of the tokenized smart contract, and wherein the tokenized smart contract is stored on the blockchain node;

detecting, by the blockchain node, receipt of a first digital payment, which is directed towards the tokenized smart contract, wherein the logic of the tokenized smart contract tracks receipt of digital payments within the audit log, and wherein the tokenized smart contract further includes logic for transmitting one or more alerts when one or more digital payments for the tokenized smart contract are missed;

causing, by the blockchain node, the first digital payment to be recorded in a distributed ledger managed by the blockchain;

while the tokenized smart contract resides in the blockchain, executing, by the blockchain node, the logic, resulting in modification of the audit log by including, in the audit log, information regarding the first digital payment;

detecting, by the blockchain node, that a second digital payment for the tokenized smart contract is missing, the second digital payment being one that is required to originate from a user;

transmitting, by the blockchain node, an alert regarding the missing second digital payment to a credit agency, wherein the alert details a missing payment status of the tokenized smart contract, the missing payment status subsequently being reflected as a tradeline in a credit report for the user, said tradeline triggering an update to a credit score for the user;

transmitting, by the blockchain node, the alert to one or more other interested parties associated with the tokenized smart contract, wherein the one or more other interested parties includes a co-signer associated with the tokenized smart contract, and wherein the alert identifies the user;

facilitating, by the blockchain node, a transfer of the tokenized smart contract from the first crypto wallet to a second crypto wallet that is also associated with the blockchain; and while the tokenized smart contract continues to reside in the blockchain, further executing, by the blockchain node, the logic, resulting in a second modification of the audit log by including, in the audit log, second information regarding the transfer of the tokenized smart contract from the first crypto wallet to the second crypto wallet, wherein the second information, whose inclusion in the audit log results in the second modification to the audit log, includes at least one of: user account information for a user associated with said transfer, Internet Protocol (IP) address information for a device associated with said transfer, or other device information for the device associated with said transfer.

2. The method of claim 1, wherein the smart contract includes a previous credit report of the user.

3. The method of claim 1, wherein the tokenized smart contract is digitally signed, and wherein digitally signing the tokenized smart contract includes signing the tokenized smart contract with one of a private key or a public key.

4. The method of claim 1, wherein possession of the tokenized smart contract indicates a right to collect on the smart contract conditions.

5. The method of claim 1, wherein the tokenized smart contract is minted using an ERC-721 standard.

6. The method of claim 1, wherein the logic of the tokenized smart contract includes logic to determine whether a payment is missed or is paid.

7. The method of claim 1, wherein the alert is transmitted to multiple credit agencies.

8. A computer system, which is implemented as a blockchain node in a blockchain, that improves the security of smart contracts configured to implement a tokenized smart contract on the blockchain, said blockchain node comprising:
one or more processors; and
one or more computer-readable hardware storage devices that store instructions that are executable by the one or more processors to cause the blockchain node to at least:
access, by the blockchain node, a smart contract that specifies smart contract conditions, wherein the smart contract conditions include an indication of a specific type of digital currency that is to be used when one or more digital payments are directed to the smart contract, and wherein the smart contract is structured for execution on a blockchain, said execution including an automatic exchange of the specific type of digital currency based on the smart contract conditions;
mint, by the blockchain node, the smart contract as a non-fungible token (NFT) to generate a tokenized smart contract that resides within a first crypto wallet associated with the blockchain, wherein the tokenized smart contract includes logic that tracks operations to determine whether the smart contract conditions have been satisfied, wherein said tracking of the operations is performed while the tokenized smart contract resides in the blockchain, wherein the tokenized smart contract is further structured to include an audit log, wherein the logic is further structured to cause the audit log to record (i) information regarding transactions for the tokenized smart contract and (ii) information regarding a transfer of the tokenized smart contract, such that the logic enables the audit log to maintain information regarding a chain of possession of the tokenized smart contract, and wherein the tokenized smart contract is stored on the blockchain node;
detect, by the blockchain node, receipt of a first digital payment, which is directed towards the tokenized smart contract, wherein the logic of the tokenized smart contract tracks receipt of digital payments within the audit log, and wherein the tokenized smart contract further includes logic for transmitting one or more alerts when one or more digital payments for the tokenized smart contract are missed;
cause, by the blockchain node, the first digital payment to be recorded in a distributed ledger managed by the blockchain;
while the tokenized smart contract resides in the blockchain, execute, by the blockchain node, the logic, resulting in modification of the audit log by including, in the audit log, information regarding the first digital payment;
detect, by the blockchain node, that a second digital payment for the tokenized smart contract is missing, the second digital payment being one that is required to originate from a user;
transmit, by the blockchain node, an alert regarding the missing second digital payment to a credit agency, wherein the alert details a missing payment status of the tokenized smart contract, the missing payment status subsequently being reflected as a tradeline in a credit report for the user, said tradeline triggering an update to a credit score for the user;
transmit, by the blockchain node, the alert to one or more other interested parties associated with the tokenized smart contract, wherein the one or more other interested parties includes a co-signer associated with the tokenized smart contract, and wherein the alert identifies the user;
facilitate, by the blockchain node, a transfer of the tokenized smart contract from the first crypto wallet to a second crypto wallet that is also associated with the blockchain; and
while the tokenized smart contract continues to reside in the blockchain, further execute, by the blockchain node, the logic, resulting in a second modification of the audit log by including, in the audit log, second information regarding the transfer of the tokenized smart contract from the first crypto wallet to the second crypto wallet, wherein the second information, whose inclusion in the audit log results in the second modification to the audit log, includes at least one of: user account information for a user associated with said transfer, Internet Protocol (IP) address information for a device associated with said transfer, or other device information for the device associated with said transfer.

9. The computer system of claim 8, wherein the smart contract is digitally signed, and wherein digitally signing the tokenized smart contract operates to prevent unauthorized users from using the tokenized smart contract.

10. The computer system of claim 8, wherein the tokenized smart contract is minted using an ERC-721 standard.

11. The computer system of claim 8, wherein the tokenized smart contract is digitally signed, and wherein digitally signing the tokenized smart contract includes signing the tokenized smart contract with a private key.

12. The computer system of claim 8, wherein the smart contract includes a previous credit score of the user.

13. A method for increasing the security of a smart contract by implementing a tokenized smart contract in a blockchain, said method being implemented by a blockchain node in a blockchain and comprising:
accessing, by the blockchain node, a smart contract that specifies smart contract conditions, wherein the smart contract includes a credit score of a user associated with the smart contract, wherein the smart contract conditions include an indication of a specific type of digital currency that is to be used when one or more digital payments are directed to the smart contract, and wherein the smart contract is structured for execution on a blockchain, said execution including an automatic exchange of the specific type of digital currency based on the smart contract conditions;

minting, by the blockchain node, the smart contract, which includes the credit score of the user, as a non-fungible token (NFT) to generate a tokenized smart contract that resides within a first crypto wallet associated with the blockchain, wherein the tokenized smart contract includes logic that tracks operations to determine whether the smart contract conditions have been satisfied, wherein said tracking of the operations is performed while the tokenized smart contract resides in the blockchain, wherein the tokenized smart contract is further structured to include an audit log, wherein the logic is further structured to cause the audit log to record (i) information regarding transactions for the tokenized smart contract and (ii) information regarding a transfer of the tokenized smart contract, such that the logic enables the audit log to maintain information regarding a chain of possession of the tokenized smart contract, and wherein the tokenized smart contract is stored on the blockchain node;

detecting, by the blockchain node, receipt of a first digital payment, which is directed towards the tokenized smart contract, wherein the logic of the tokenized smart contract tracks receipt of digital payments within the audit log, and wherein the tokenized smart contract further includes logic for transmitting one or more alerts when one or more digital payments for the tokenized smart contract are missed;

causing, by the blockchain node, the first digital payment to be recorded in a distributed ledger managed by the blockchain;

while the tokenized smart contract resides in the blockchain, executing, by the blockchain node, the logic, resulting in modification of the audit log by including, in the audit log, information regarding the first digital payment;

detecting, by the blockchain node, that a second digital payment for the tokenized smart contract is missing, the second digital payment being one that is required to originate from a user;

transmitting, by the blockchain node, an alert regarding the missing second digital payment to a credit agency, wherein the alert details a missing payment status of the tokenized smart contract, the missing payment status subsequently being reflected as a tradeline in a credit report for the user, said tradeline triggering an update to a credit score for the user;

transmitting, by the blockchain node, the alert to one or more other interested parties associated with the tokenized smart contract, wherein the one or more other interested parties includes a co-signer associated with the tokenized smart contract, and wherein the alert identifies the user;

facilitating, by the blockchain node, a transfer of the tokenized smart contract from the first crypto wallet to a second crypto wallet that is also associated with the blockchain; and while the tokenized smart contract continues to reside in the blockchain, further executing, by the blockchain node, the logic, resulting in a second modification of the audit log by including, in the audit log, second information regarding the transfer of the tokenized smart contract from the first crypto wallet to the second crypto wallet, wherein the second information, whose inclusion in the audit log results in the second modification to the audit log, includes at least one of: user account information for a user associated with said transfer, Internet Protocol (IP) address information for a device associated with said transfer, or other device information for the device associated with said transfer.

14. The method of claim 13, wherein the tokenized smart contract is minted using an ERC-721 standard.

15. The method of claim 13, wherein possession of the tokenized smart contract indicates a right to collect on the smart contract conditions.

16. The method of claim 1, wherein the smart contract is minted as the NFT using a minting platform that is included in a group of minting platforms, the group of minting platforms comprising an opensea.io minting platform.

17. The method of claim 1, wherein the tokenized smart contract informs the first crypto wallet of the receipt of the first digital payment.

18. The method of claim 1, wherein the blockchain is a Bitcoin blockchain.

19. The method of claim 1, wherein, when a new block is added to the blockchain, a hash of a previous block occurring previous in time to the new block is computed and is added to the new block.

20. The method of claim 19, wherein the new block is delayed from being included in the blockchain until a delay time period is satisfied.

* * * * *